(12) United States Patent  
Maertens (10) Patent No.: US 7,780,186 B2  
(45) Date of Patent: Aug. 24, 2010

(54) AIRBAG MODULE COVER

(75) Inventor: Paul George Maertens, Highland, MI (US)

(73) Assignee: TK Holdings Inc., Auburn Hills, MI (US)

( * ) Notice: Subject to any disclaimer, the term of this patent is extended or adjusted under 35 U.S.C. 154(b) by 1413 days.

(21) Appl. No.: 10/944,773

(22) Filed: Sep. 21, 2004

(65) Prior Publication Data

US 2006/0061070 A1    Mar. 23, 2006

(51) Int. Cl.  
B60R 21/16 (2006.01)

(52) U.S. Cl. ............... 280/728.2; 280/728.3; 280/731; 280/732

(58) Field of Classification Search .............. 280/728.2, 280/728.3, 731, 732  
See application file for complete search history.

(56) References Cited

U.S. PATENT DOCUMENTS

| | | | |
|---|---|---|---|
| 5,390,950 A * | 2/1995 | Barnes et al. | 280/728.3 |
| 5,569,959 A * | 10/1996 | Cooper et al. | 280/728.3 |
| 5,845,929 A * | 12/1998 | Schlett et al. | 280/728.3 |
| 5,851,022 A * | 12/1998 | Yamamoto et al. | 280/728.3 |
| 5,915,724 A | 6/1999 | Daris et al. | |
| 5,979,931 A * | 11/1999 | Totani et al. | 280/728.3 |
| 6,106,003 A * | 8/2000 | Rahmstorf et al. | 280/728.3 |
| 6,237,933 B1 * | 5/2001 | Takahashi et al. | 280/728.3 |
| 6,337,461 B1 | 1/2002 | Yasuda et al. | |
| 6,422,595 B1 | 7/2002 | Breed et al. | |
| 6,440,514 B1 * | 8/2002 | Ueno et al. | 428/43 |
| 6,457,739 B1 * | 10/2002 | Dailey et al. | 280/728.3 |
| 6,505,850 B2 | 1/2003 | Helfrich et al. | |
| 6,533,314 B2 * | 3/2003 | Merrifield et al. | 280/728.3 |
| 6,557,886 B1 | 5/2003 | Sakaguchi | |
| 6,568,704 B2 * | 5/2003 | Iida et al. | 280/728.3 |
| 6,616,176 B2 | 9/2003 | Uchiyama et al. | |
| 6,619,691 B1 | 9/2003 | Igawa | |
| 6,655,711 B1 * | 12/2003 | Labrie et al. | 280/728.3 |
| 6,692,016 B2 | 2/2004 | Yokota et al. | |
| 6,753,057 B1 * | 6/2004 | Gardner, Jr. | 428/43 |
| 7,040,649 B2 * | 5/2006 | Totani et al. | 280/728.3 |
| 7,121,578 B2 * | 10/2006 | Cowelchuk et al. | 280/728.3 |

FOREIGN PATENT DOCUMENTS

EP    1 193 140 A2    4/2002

* cited by examiner

Primary Examiner—Toan C To  
(74) Attorney, Agent, or Firm—Foley & Lardner LLP (57) ABSTRACT

A cover for an airbag module includes at least a first layer, a second layer, and a third layer. The first layer includes a predefined tear line and the third layer is configured to face into a passenger compartment of a vehicle.

12 Claims, 9 Drawing Sheets

AIRBAG MODULE COVER

BACKGROUND OF THE INVENTION

The present invention relates to an airbag module and, more particularly, to an airbag module cover that includes an outer surface that forms part of a vehicle instrument panel.

In an airbag device for a vehicle, an airbag is typically accommodated in an airbag module that includes a retainer covered by a module cover. The retainer is connected to the vehicle structure, and the outer surface of the module cover faces into the vehicle passenger compartment. For a driver airbag device, the airbag module is mounted to a steering wheel of a vehicle. For a passenger airbag device, the airbag module is mounted to an instrument panel of the vehicle. In the event of a vehicle emergency such as a collision, an inflator in the airbag module delivers inflation gas into the airbag thereby inflating the airbag. As the airbag inflates, the airbag exerts pressure on the module cover. When sufficient pressure is exerted on the module cover, the cover ruptures and opens toward the inside of the vehicle cabin thereby allowing the airbag to be inflated inside the vehicle cabin to protect a vehicle occupant.

One disadvantage of conventional airbag modules is that the module cover must be made of materials that can be configured to rupture and that can withstand high airbag deployment temperatures. As a result, conventional module covers typically include an injection molded base layer having a pre-weakened portion such as a tear line groove that ruptures or breaks when sufficient pressure is exerted on the module cover by the inflating airbag. Conventional module covers generally also include a surface sheet disposed on the base layer so that the outer surface of the module cover matches the appearance and feel of the vehicle instrument panel. The surface sheet may include a lower layer formed of a thermally resistant resin, a middle layer formed of a soft foamed resin, and an outer decorative layer formed of a thermoplastic elastomer (TPE). The TPE can be, for example, polyolefin based (TPO), polystyrene based (TPS), polyvinyl chloride based, polyester based, polyamide based, or urethane based.

As a result of the above requirements and construction, the design and appearance (e.g., texture, color, pattern, surface finish) of conventional module covers is limited. Moreover, the thermoplastic elastomers forming the decorative layer are not well suited for application of coatings and paints thereby further limiting the appearance of the module cover so that desired customer finishes often can not be achieved.

SUMMARY OF THE INVENTION

According to one embodiment of the present invention, cover for an airbag module is provided. The cover includes at least a first layer, a second layer, and a third layer. The first layer includes a predefined tear line and the third layer is configured to face into a passenger compartment of a vehicle.

According to another embodiment of the present invention, a cover for an airbag module includes a base layer and a substrate disposed on the base layer. The substrate includes a pair of panels each including an outer layer.

According to another embodiment of the invention, an airbag module for a vehicle includes an airbag, an inflator, and a cover. The cover includes a top surface facing toward an interior of the vehicle. The top surface comprises metal.

According to another embodiment of the invention, an airbag module is configured to be positioned in a vehicle so that a cover of the module forms a portion of the vehicle instrument panel. The cover includes a metal top layer configured to separate into at least two pieces to allow an airbag to deploy therethrough.

According to yet another embodiment of the invention, a method of forming a cover for an airbag module includes providing a base layer having a pre-weakened portion for deploying an airbag, providing a substrate having a first panel and a second panel, providing a first metal sheet and a second metal sheet, wrapping the first metal sheet around the first panel so that the first metal sheet substantially covers front and side surfaces of the first panel, wrapping the second metal sheet around the second panel so that the second metal sheet substantially covers front and side surfaces of the second panel, and attaching the first and second panels to the base layer.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate a preferred embodiment of the invention and together with the description, serve to explain principles of the invention.

DETAILED DESCRIPTION

FIGS. 1-4 show an embodiment of an airbag module 100 according to the present invention. The airbag module 100 includes an airbag 10, an inflator 20, a retainer 30, and a module cover 40.

The airbag 10, the inflator 20, and the retainer 30 are not specific to the present invention and may be any airbag, inflator, and/or retainer generally known to those of skill in the art. Similarly, the airbag 10, the inflator 20, the retainer 30, and the module cover 40 may be connected together and installed in a vehicle using known methods and components. For example, the retainer 30 may be configured to be connected to the vehicle structure. The airbag 10 and the inflator 20 may be secured to the retainer 30. The retainer 30 and the module cover 40 may be connected together so that an enclosure 35 is formed between the retainer 30 and the module cover 40. The airbag 10 is disposed in the enclosure 35 in a folded state (shown in FIG. 1) and is operatively connected to the inflator 20. During a vehicle emergency, the inflator 20 generates inflation gas, which flows into the airbag 10 to inflate the airbag 10.

Figure 1:
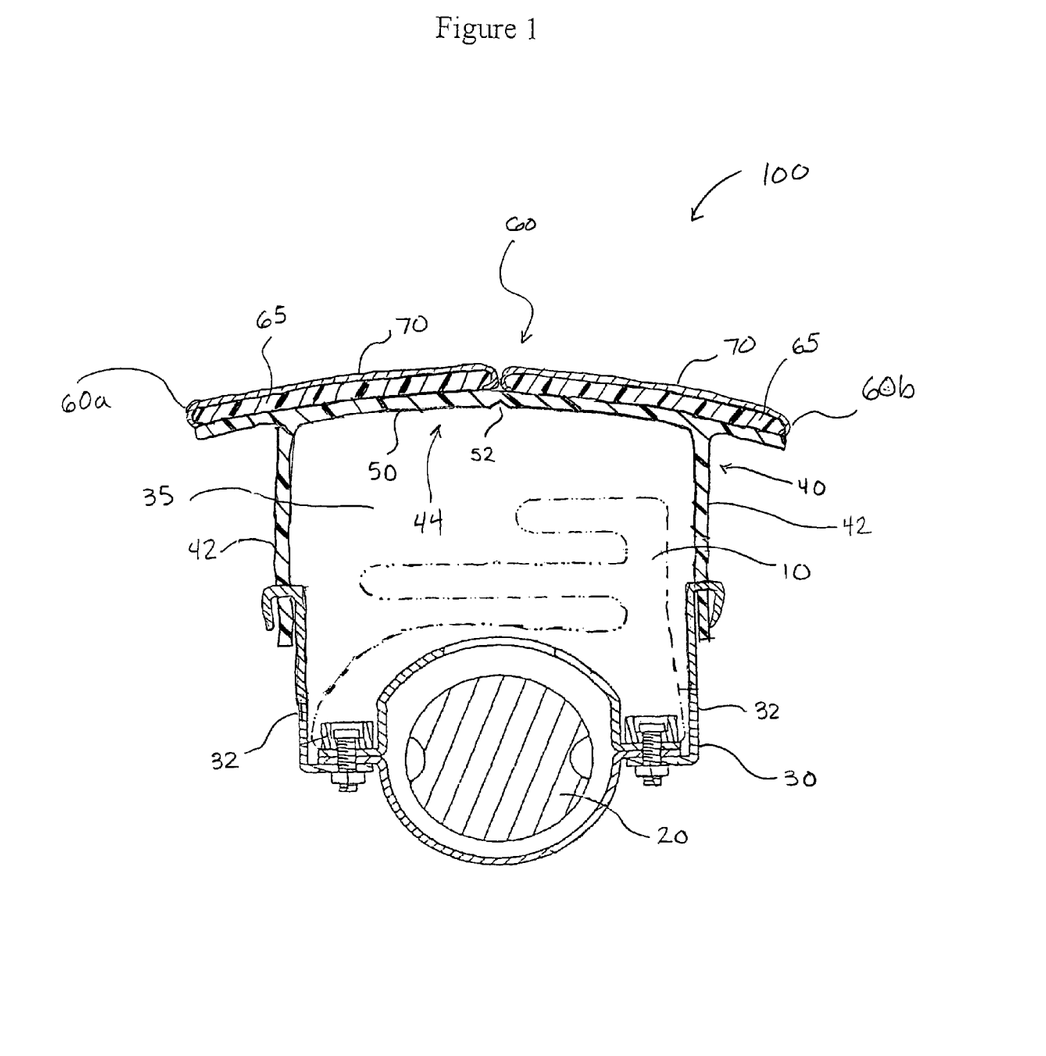
FIG. 1 is a cross sectional side view of an embodiment of an airbag module according to the present invention.

According to an embodiment, the module cover 40 includes a skirt 42 and a lid 44. The skirt 42 projects from a rear (or inner) surface of the lid 44 as shown in FIG. 1. As is well known, the skirt 42 may be, for example, a continuous member or may include a plurality of separate leg members. The skirt 42 provides an interface for connecting the module cover 40 to the retainer 30. For example, the skirt 42 may be connected to a corresponding connector portion 32 of the retainer 30 in any manner known to those of skill in the art.

Figure 5:
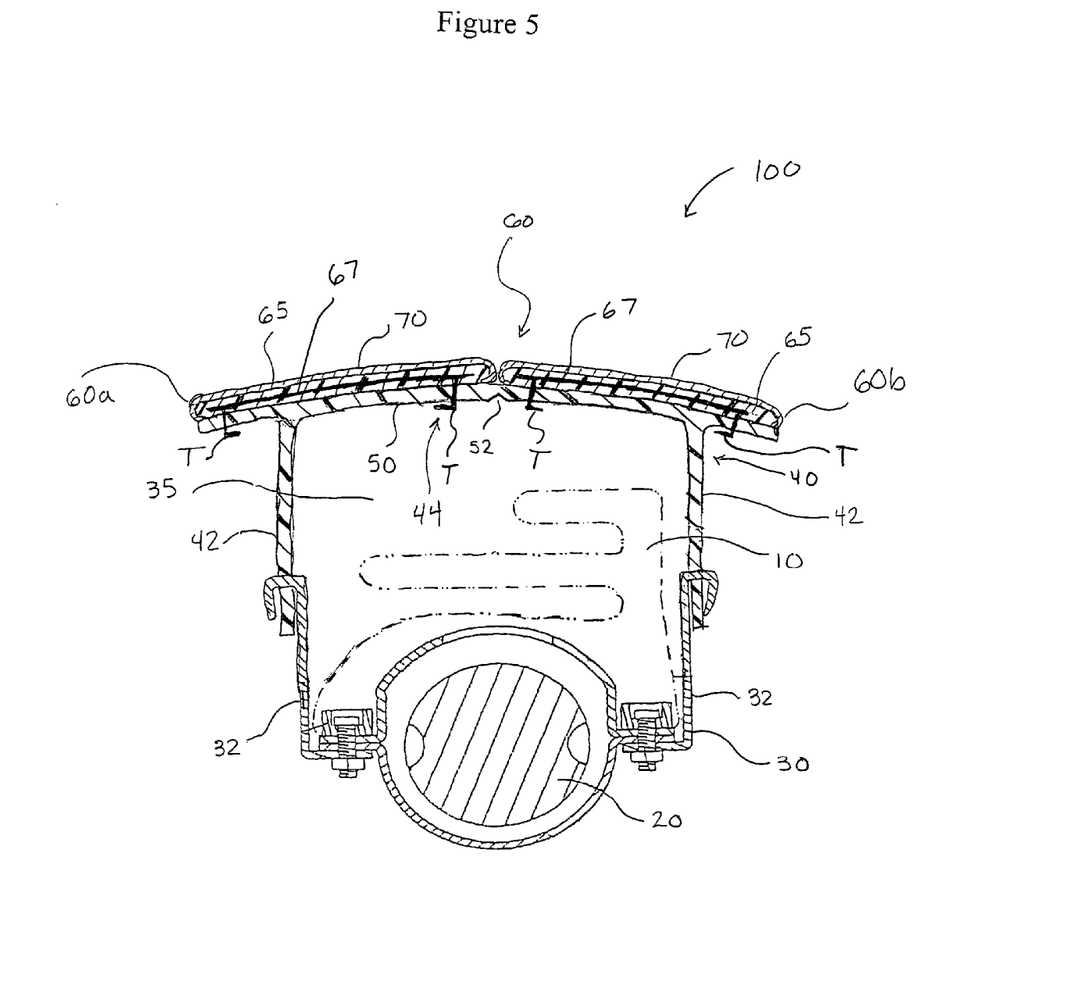
FIG. 5 is a cross sectional side view of an embodiment of an airbag module according to the present invention.

The lid 44 of the module cover 40 forms part of a vehicle instrument panel 200 when the airbag module 100 is installed in a vehicle. As shown in FIG. 5, a front (or outer) surface of the lid 44 is substantially aligned with an outer surface 270 of the instrument panel 200 and faces toward an interior 300 of the vehicle (i.e., into a vehicle passenger compartment). The lid 44 includes a base layer 50 and a cover layer 60. The base layer 50 underlies the cover layer 60 and forms the rear surface of the lid 44. The cover layer 60 is attached to the base layer 50 and forms the front surface of the lid 44 as shown in FIG. 1.

Figure 6:
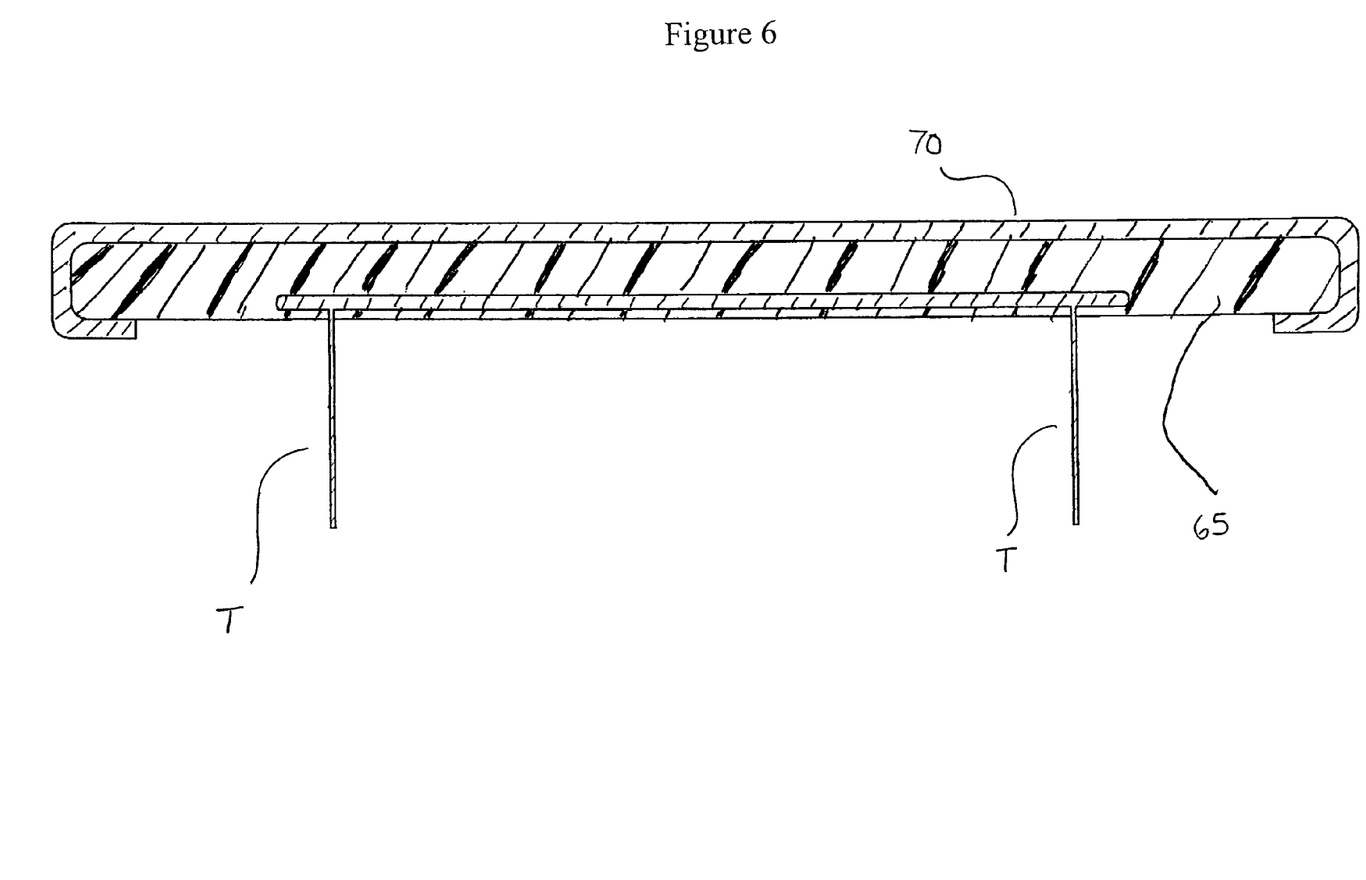
FIG. 6 is a cross sectional side view of a cover layer of FIG. 5.
Figure 7:
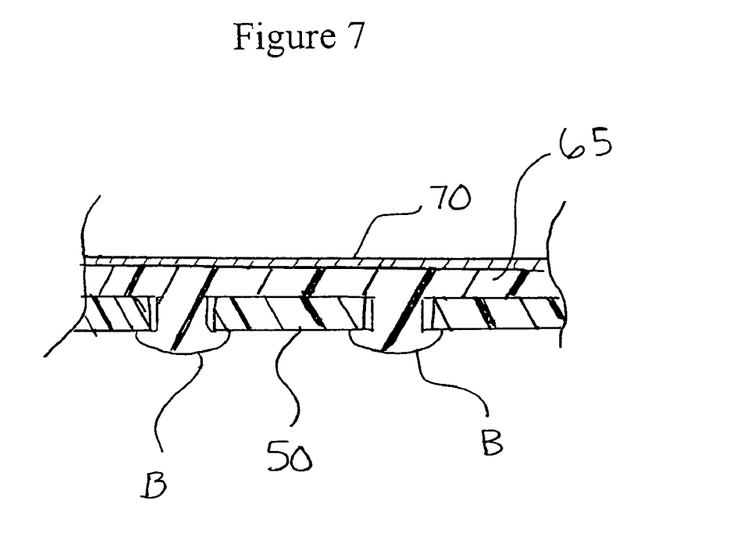
FIG. 7 is a cross sectional side view according to an embodiment of the present invention showing attachment of an airbag module cover layer to a base layer.

The cover layer 60 may be attached to the base layer 50 using attachment hardware or an adhesive. The cover layer 60 may also be configured to snap onto the base layer 50. In an exemplary embodiment, the base layer 50 includes a plurality of through holes, and the cover layer 60 includes corresponding bosses B. The cover layer 60 is connected to the base layer 50 by inserting the bosses B into the through holes and post-forming (e.g., melting) the bosses B to retain the cover layer 60 on the base layer 50 as shown in FIG. 7. In another exemplary embodiment, the cover layer 60 is secured to the base layer 50 by tabs T. As shown in FIG. 6, the tabs T are disposed on a bracket 67 (e.g., a stamped metal bracket). The bracket 67 may be inserted into recesses (not shown) in the substrate 65 or molded into the substrate 65 so that the tabs T project from the substrate 65. The base layer 50 includes corresponding through holes into which the tabs T are inserted. As shown in FIG. 5, the tabs T are then bent over to mechanically secure the cover layer 65 to the base layer 50. The bent tabs T may be heat staked for additional strength.

The base layer 50 of the lid 44 may be made of any plastic or polymer suitable for use in an airbag module cover application. However, the base layer 50 is preferably formed of thermoplastic olefin (TPO). Additionally, a groove 52 (shown in FIG. 1) may be formed in the base layer 50. The groove 52 is a pre-weakened tear line (or breaking point) that ruptures when the inflating airbag 10 exerts sufficient pressure on the lid 44. When the airbag 10 inflates, the groove 52 ruptures and the lid 44 swings open at the groove 52 to enable the inflating airbag 10 to deploy through the lid 44 into the vehicle passenger compartment 300.

The cover layer 60 of the lid 44 includes a substrate 65 and a surface layer 70. The substrate 65 forms the structure of the cover layer 65 so that the cover layer 60 is sufficiently durable and wear resistant. The substrate 65 may be made of any plastic or polymer suitable for use in an airbag module cover application. In an exemplary embodiment, the substrate 65 is formed of polycarbonate/ABS. As shown in FIGS. 1 and 3A-3C, the surface layer 70 is disposed on the substrate 65 and forms an outer (or top) layer of the lid 44. As a result, the surface layer 70 dictates the appearance of the cover layer 60. The surface layer 70 may be made of leather, a synthetic material (e.g., plastic), or a metallic material (e.g., aluminum, copper, brass, stainless steel, chrome, etc.). In an exemplary embodiment, surface layer 70 is made of aluminum. Additionally, the feel of the cover layer 60 may be customized based on the particular stylistic theme of the vehicle. For example, the cover layer 60 may be rigid so that the cover layer 60 is substantially impervious to deformation. Alternatively, the cover layer 60 may include cushioning so that the cover layer 60 has a pliable feel.

Figure 3A:
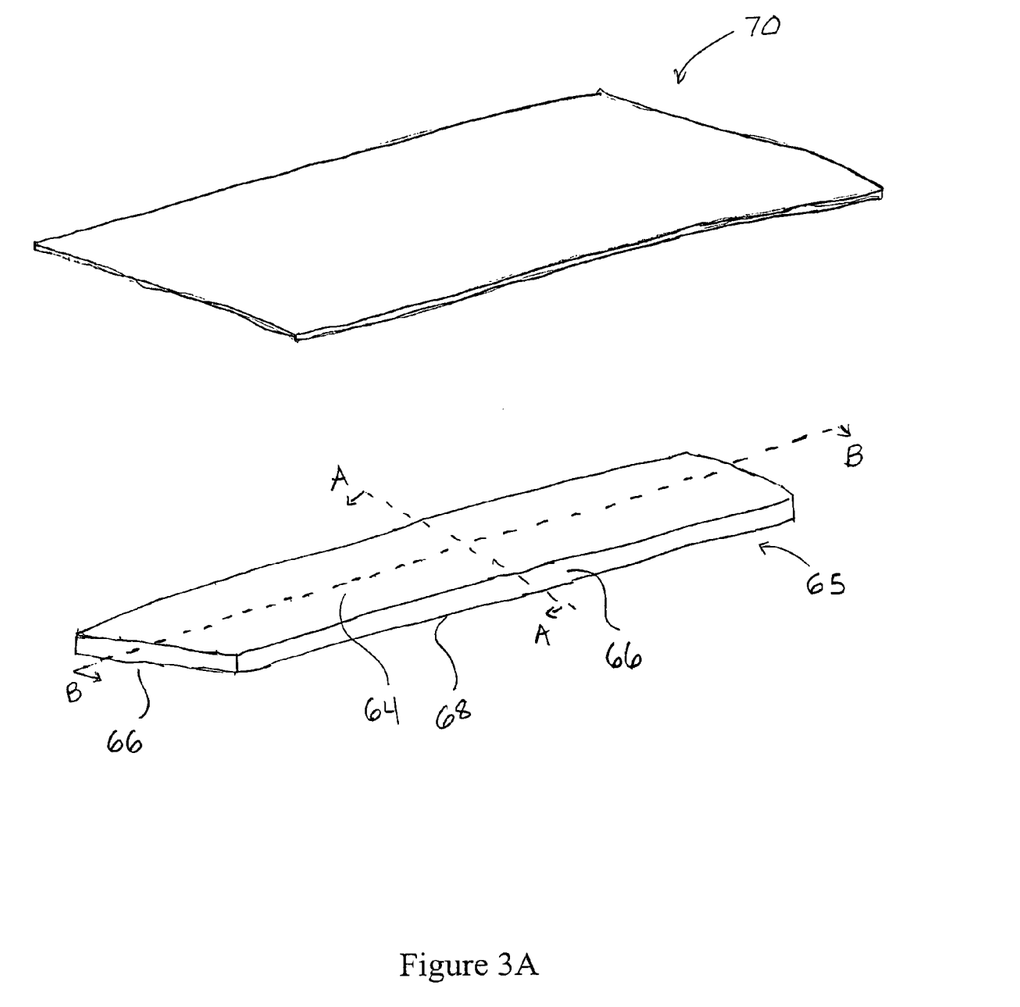
FIG. 3A is a perspective view of a substrate and a surface layer of the module cover of FIG. 2 showing the surface layer prior to installation on the substrate.
Figure 3B:
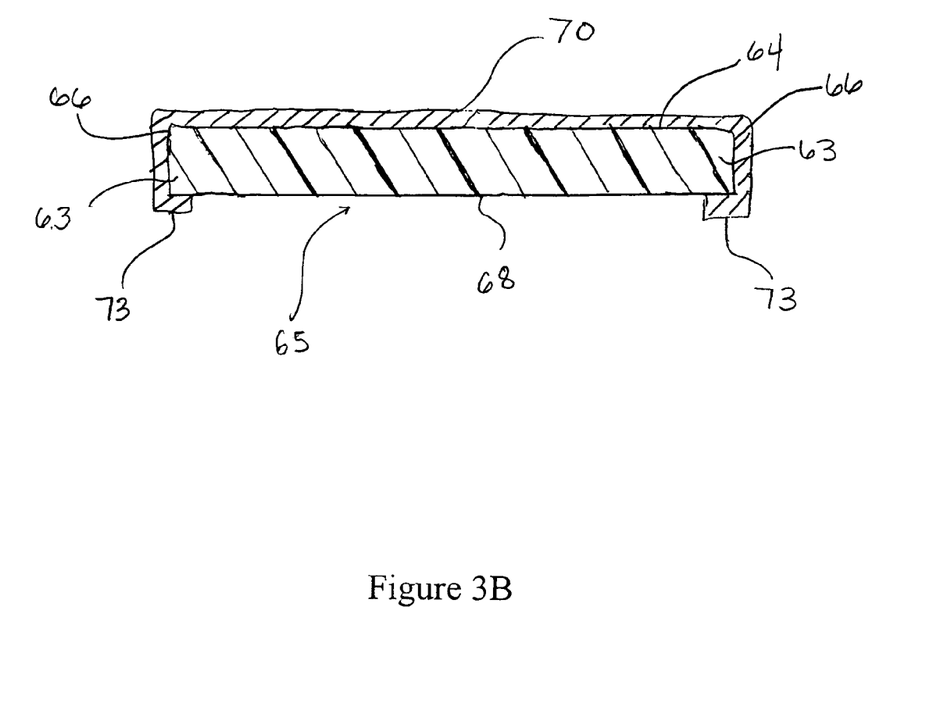
FIG. 3B is a cross sectional view taken along the line A-A of FIG. 3A showing the surface layer installed on the substrate.
Figure 3C:
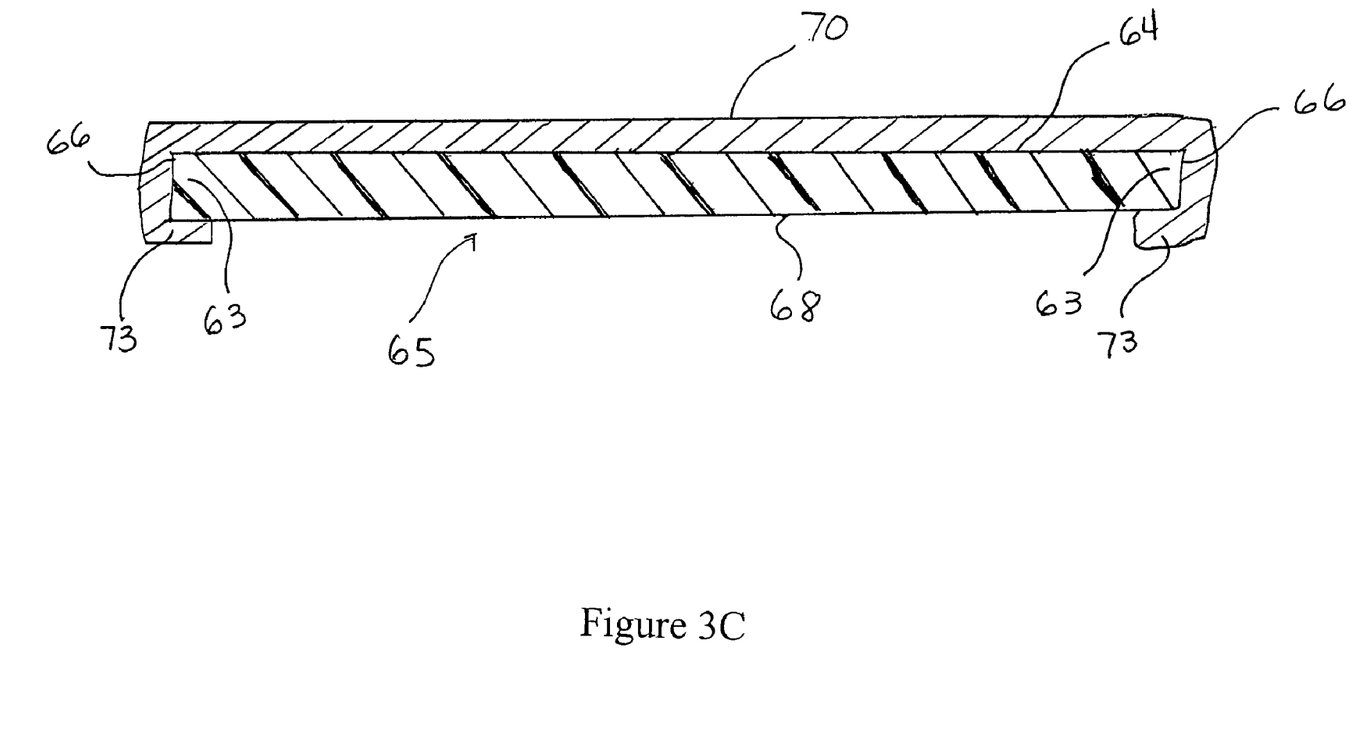
FIG. 3C is a cross sectional view taken along the line B-B of FIG. 3A showing the surface layer installed on the substrate.
Figure 4:
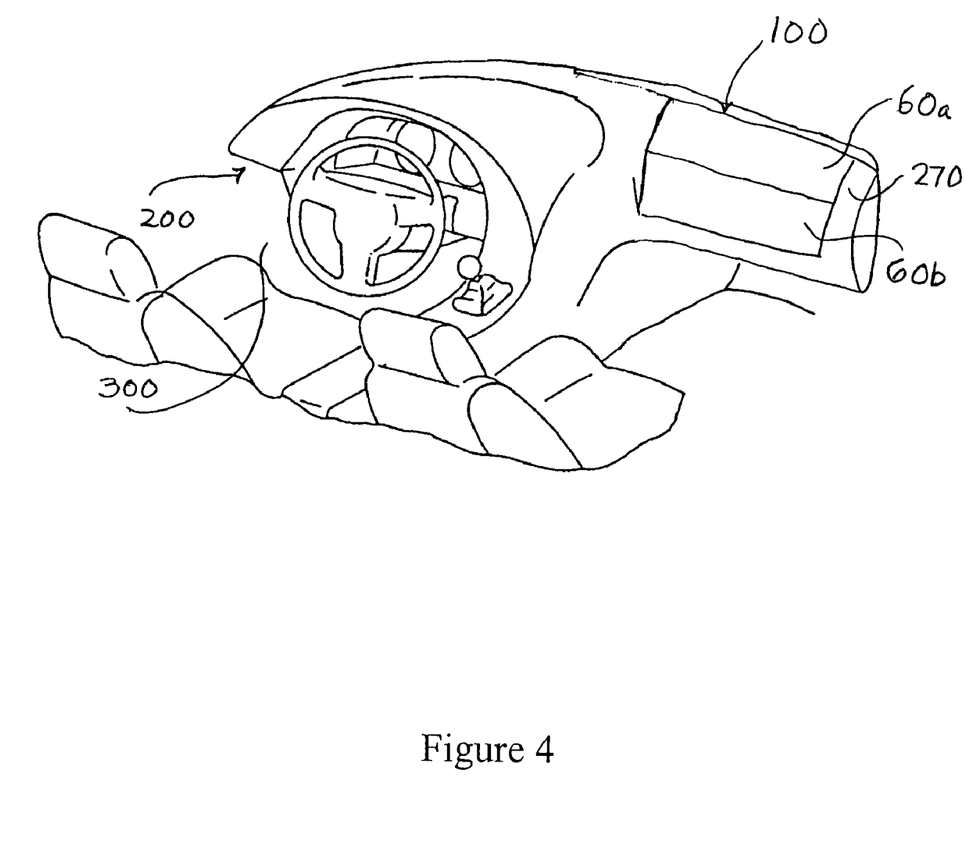
FIG. 4 is a perspective view of the airbag module of FIG. 1 installed in a vehicle instrument panel.

The surface layer 70 is configured to be disposed on the substrate 65 so that the surface layer 70 substantially covers a front surface 64 and a side surface 66 of the substrate 65 as shown in FIGS. 3A and 3B. The surface layer 70 may also cover a rear surface 68 of the substrate 65. In an exemplary embodiment (shown in FIG. 3A), the surface layer 70 is formed as a sheet, and the substrate 65 is formed as a panel. As shown in FIGS. 3A-3C, the surface layer 70 is attached to the substrate 65 by placing the surface layer 70 on the substrate 65 and folding (or wrapping) edges 73 of the surface layer 70 over and around edges 63 of the substrate 65. After the folding operation, the edges 73 of the surface layer 70 may be secured to the substrate 65 by crimping the edges 73 of the surface layer 70 to the rear surface 68 of the substrate 65. The surface layer 70 may also be secured to the substrate 65 by tacking, adhesive, and/or standard attachment hardware so that the surface layer 70 remains fixed to the substrate 65. According to an alternative embodiment, the surface layer 70 may be formed by sputtering a metallic material (e.g., chrome) onto the substrate 65.

Figure 8:
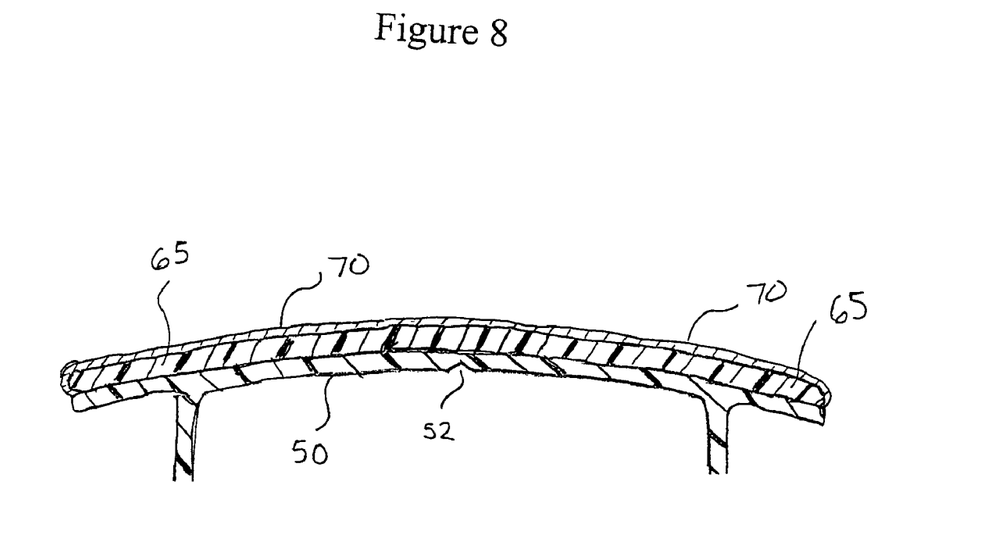
FIG. 8 is a cross sectional side view of an embodiment of an airbag module according to the present invention.

According to an embodiment, the cover layer 60 may be formed as a single portion, as shown in FIG. 8. For example, the substrate 65 may be a one-piece panel, and the surface layer 70 may be a decal configured to adhere to the substrate 65. In this embodiment, the substrate 65 and the surface layer 70 each have a thickness that is sufficiently thin to enable the airbag 10 to deploy through the cover layer 60. As a result, a pre-weakened tear line does not need to be formed in the cover layer 60. Thus, the manufacturing process is simplified because a pre-weakened portion (i.e., groove 52) needs to be formed only on the base layer 50.

Figure 2:
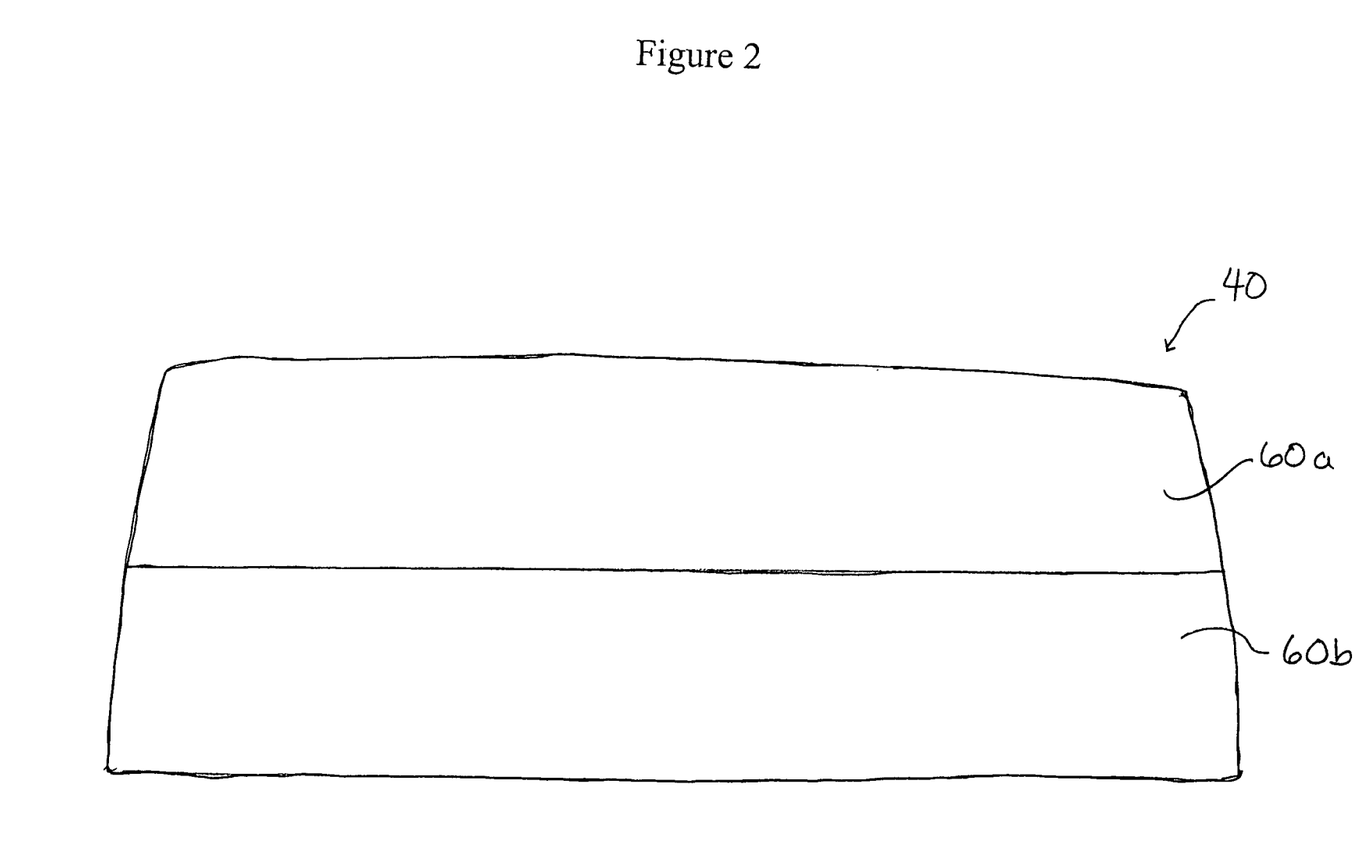
FIG. 2 is a top plan view of a module cover of the airbag module of FIG. 1.

According to another embodiment, the cover layer 60 may include multiple portions as shown in FIG. 2. For example, the cover layer 60 may include a first portion 60a and a second portion 60b. Each of the first and second portions 60a and 60b includes a substrate 65 and a cover layer 70 substantially as described above. In this embodiment, the cover layer 60 is attached to the base layer 50 so that the first portion 60a is disposed on one side of the groove 52. The second portion 60b is disposed adjacent to the first portion 60a but is located on an opposite side of the groove 52. As shown in FIG. 5, relative to the vehicle instrument panel 200, the first portion 60a may be located above the groove 52 to form a first door (or panel), and the second portion 60b may be located below the groove 52 to form a second door (or panel).

In this embodiment, because the first and second portions 60a and 60b are disposed adjacent to one another but on opposite sides of the groove 52, the first and second portions 60a and 60b of the cover layer 60 separate (or move apart) from one another when the base layer 50 ruptures at the groove 52. Thus, the cover layer 60 is not required to rupture in order for the airbag 10 to deploy. As a result, a wide variety of materials may be used to form the cover layer 60. For example, metals and other materials considered to be non-compliant for airbag applications may be used to form the cover layer 60. The expanded range of materials allows the design of various patterns that enhance the look and feel of the cover layer 60 for so that the cover layer 60 may be customized for a desired styling themes (e.g., leather wraps, patterns, graphic emblem designs, embossed metal, paint, etc.). Additionally, the cover layer 60 does not require additional processing to form a pre-weakened portion to facilitate airbag deployment.

According to an embodiment, a method of forming the module cover 40 for the airbag module 100 includes providing a base layer 50 having a groove (or pre-weakened portion) 52 for deploying the airbag 10, providing a substrate 65 including a first portion (or panel) and a second portion (or panel), providing a surface layer 70 including a first metal sheet and a second metal sheet, wrapping the first metal sheet around the first panel so that the first metal sheet substantially covers front and side surfaces of the first panel, wrapping the second metal sheet around the second panel so that the second metal sheet substantially covers front and side surfaces of the second panel, and attaching the first and second panels to the base layer.

Although the airbag module 100 shown in FIG. 1 is an airbag module for a passenger airbag device, the present invention is not limited to passenger airbag devices. Rather, the invention applies to any airbag device having an airbag module cover that is visible from a passenger compartment of a vehicle, including driver airbag devices, head/side curtain airbag devices, and side impact airbag devices.

Thus, according to embodiments of the present invention, an airbag module cover having an outer surface that forms part of a vehicle instrument panel is provided. The outer surface may be formed form a variety of materials not typically used in airbag module applications and enables the airbag module cover to have an appearance and feel that can not be achieved with conventional module covers.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A cover for an airbag module, comprising:
   at least a first layer, a second layer, and a third layer,
   wherein the first layer includes a predefined tear line and the third layer is configured to face into a passenger compartment of a vehicle,
   wherein the third layer is made of a metallic material,
   wherein the second and third layers are each separated into two portions,
   wherein the third layer comprises a separation that completely separates the third layer into two separate portions.

2. The cover of claim 1, wherein a first portion of the third layer is disposed on a first portion of the second layer and a second portion of the third layer is disposed on a second portion of the second layer.

3. The cover of claim 2, wherein the first and second portions of the second layer are disposed on the first layer.

4. The cover of claim 3, wherein the first portion of the second layer is disposed on one side of the predefined tear line and the second portion of the second layer is disposed on an opposite side of the predefined tear line.

5. The cover of claim 2, wherein each of the first and second portions of the second layer includes a front surface and a side surface, and wherein the first and second portions of the third layer substantially cover the front and side surfaces.

6. The cover of claim 5, wherein each of the first and second portions of the second layer includes a rear surface, and wherein the first and second portions of the third layer cover at least a portion of the rear surface.

7. The cover of claim 1, wherein the third layer is an outermost layer of the cover.

8. The cover of claim 7, wherein an entirety of the third layer is the metallic material.

9. The cover of claim 1, wherein the separation between the two portions of the third layer is located above and is aligned with the tear line of the first layer.

10. A cover for an airbag module, comprising:
    a base layer; and
    a substrate disposed on the base layer,
    wherein the substrate includes a pair of panels each including an outer layer,
    wherein the outer layer comprises a metallic material,
    wherein the outer layer of each panel is crimped to the panel,
    wherein the outer layer is an outermost layer of the cover,
    wherein the outer layer comprises a separation that completely separates the outer layer into two separate portions.

11. The cover of claim 10, wherein the base layer comprises a tear line,
    wherein the separation between the two portions of the outer layer is located above and is aligned with the tear line of the base layer.

12. The cover of claim 10, wherein an entirety of the outer layer is the metallic material.

* * * * *